US008340065B2

(12) United States Patent
Gupta et al.

(10) Patent No.: US 8,340,065 B2
(45) Date of Patent: Dec. 25, 2012

(54) TECHNIQUE FOR MANAGING WIRELESS NETWORKS

(75) Inventors: Parag Gupta, San Jose, CA (US); Vitaly Kruglikov, Palo Alto, CA (US); Robert Haitani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 39 days.

(21) Appl. No.: 13/038,785

(22) Filed: Mar. 2, 2011

(65) Prior Publication Data

US 2011/0149937 A1 Jun. 23, 2011

Related U.S. Application Data

(62) Division of application No. 11/428,532, filed on Jul. 3, 2006, now Pat. No. 7,920,531.

(60) Provisional application No. 60/725,892, filed on Oct. 11, 2005.

(51) Int. Cl.
*H04Q 7/24* (2006.01)

(52) U.S. Cl. ........ 370/338; 370/401; 370/329; 370/351; 370/254; 455/466; 455/410; 455/91.1; 455/161.2; 455/434; 455/422; 455/166.1; 455/426

(58) Field of Classification Search ............... 455/426.1, 455/41.2, 434, 161.2, 432.1, 422.1, 166.1, 455/3.02, 564, 466, 410, 90.1, 552.1, 542, 455/411; 370/401, 329, 351, 254, 230, 252; 709/227, 229, 228, 249
See application file for complete search history.

(56) References Cited

U.S. PATENT DOCUMENTS

| | | | |
|---|---|---|---|
| 6,671,727 B1 * | 12/2003 | Odenwald | 709/227 |
| 7,089,006 B2 | 8/2006 | Idnani et al. | |
| 7,091,959 B1 | 8/2006 | Clary | |
| 7,200,112 B2 | 4/2007 | Sundar et al. | |
| 7,224,970 B2 | 5/2007 | Smith et al. | |
| 7,313,111 B2 | 12/2007 | Hietalahti et al. | |
| 7,366,511 B2 | 4/2008 | Jaakkola et al. | |
| 7,444,008 B2 | 10/2008 | Gortler et al. | |
| 7,876,735 B2 | 1/2011 | Krantz et al. | |
| 7,881,267 B2 | 2/2011 | Crosswy et al. | |
| 7,957,763 B2 | 6/2011 | Leon et al. | |
| 2003/0134636 A1 | 7/2003 | Sundar et al. | |
| 2003/0134650 A1 | 7/2003 | Sundar et al. | |
| 2004/0018857 A1 * | 1/2004 | Asokan et al. | 455/564 |
| 2004/0083257 A1 | 4/2004 | Gortler et al. | |
| 2004/0203745 A1 * | 10/2004 | Cooper | 455/432.1 |
| 2004/0249962 A1 | 12/2004 | Lecomte | |
| 2005/0147073 A1 | 7/2005 | Hietalahti et al. | |
| 2005/0153692 A1 * | 7/2005 | Hwang et al. | 455/434 |
| 2005/0208913 A1 * | 9/2005 | Raisinghani et al. | 455/161.2 |
| 2005/0286476 A1 | 12/2005 | Crosswy et al. | |
| 2006/0009216 A1 * | 1/2006 | Welnick et al. | 455/434 |
| 2006/0089138 A1 | 4/2006 | Smith et al. | |
| 2006/0105713 A1 * | 5/2006 | Zheng et al. | 455/41.2 |
| 2006/0121900 A1 | 6/2006 | Idnani et al. | |
| 2006/0135068 A1 | 6/2006 | Jaakkola et al. | |
| 2006/0171332 A1 * | 8/2006 | Barnum | 370/254 |
| 2007/0025371 A1 * | 2/2007 | Krantz et al. | 370/401 |
| 2007/0026856 A1 * | 2/2007 | Krantz et al. | 455/426.1 |
| 2007/0127409 A1 | 6/2007 | Leon et al. | |

* cited by examiner

*Primary Examiner* — Joseph Arevalo

(57) ABSTRACT

Network connectivity may be managed on a computing device. An identifier of each wireless access point or network that is available at a given location is determined. The identifier determined without the device attempting to connect to any available wireless access point or network at the given location. Each determined identifier is compared to one or more network identifiers that are known to the device. The device connects to an available wireless access point having the identifier that is known and detected.

17 Claims, 5 Drawing Sheets

TECHNIQUE FOR MANAGING WIRELESS NETWORKS

RELATED APPLICATIONS

This application is a divisional of U.S. patent application Ser. No. 11/428,532, filed on Jul. 3, 2006, now U.S. Pat. No. 7,920,531, entitled TECHNIQUE FOR MANAGING WIRELESS NETWORKS, and claims benefit of priority to provisional U.S. Patent Application No. 60/725,892, filed on Oct. 11, 2005, entitled WIRELESS CONNECTIVITY USER-INTERFACE FEATURES, and naming Parag Gupta as inventor; the aforementioned applications are hereby incorporated by reference.

TECHNICAL FIELD

The disclosed embodiments relate generally to the field of establishing network connectivity, and more particularly, a technique for managing wireless networks.

BACKGROUND

Communication devices have evolved to include numerous types of communication capabilities and functionality. For example, handheld devices exist that operate as cellular phones, messaging terminals, Internet devices, while including personal information management (PIM) software and photo-management applications. Consumer-friendly computing technology as also been incorporated into numerous mobile mediums, such as watches and automobiles.

With the increase of portable computing devices, the use of wireless local area networks (wireless access point) has increased dramatically. In particular, wireless access point networks operating under standards promulgated by IEEE 802.11 (alternatively referred to as Wireless Fidelity or Wi-Fi networks) have widespread use in homes and businesses. These networks are sometimes password protected, to guard against access by unauthorized users. In such cases, the Wi-Fi networks enable an authorized connecting computer to connect to a gateway and access the Internet through a service provider. On closed networks, the Wi-Fi networks provide connecting computers access and use of servers or computers that have shared files and resources.

There are also Wi-Fi networks that provide the public access to gateways and the Internet. These networks are often provided with coffee shops, restaurants, book stores and other businesses ("Hot Spots") that would like to provide the service for customers. There is also a movement to make portions of entire cities or districts into Wi-Fi zones, where numerous Wi-Fi access points are provided on a given area. Hot zones and other public uses of Wi-Fi networks often provide users with access to the Internet via a common gateway.

In order to connect to a Wi-Fi network, current implementations require a user to open or trigger a programmatic sequence of events on a Wi-Fi enabled device. Under one design, the user can simply attempt to make a Wi-Fi connection, and the device will then attempt to connect to a Wi-Fi network that is identified from a list. If the device cannot find the network, the device will seek to connect to another network on the list. Alternatively, the user can initiate a manual process where he or she selects to scan for Wi-Fi networks. The scan displays what networks are available, and the user can then select to connect to one of the networks based on, for example, signal strength or security parameters. This latter option is often preferable whenever the user has to connect to a network that is different than the network he previously connected to, because it avoids the process where the device attempts to make a connection to a network that is not available.

DETAILED DESCRIPTION

Figure 1:
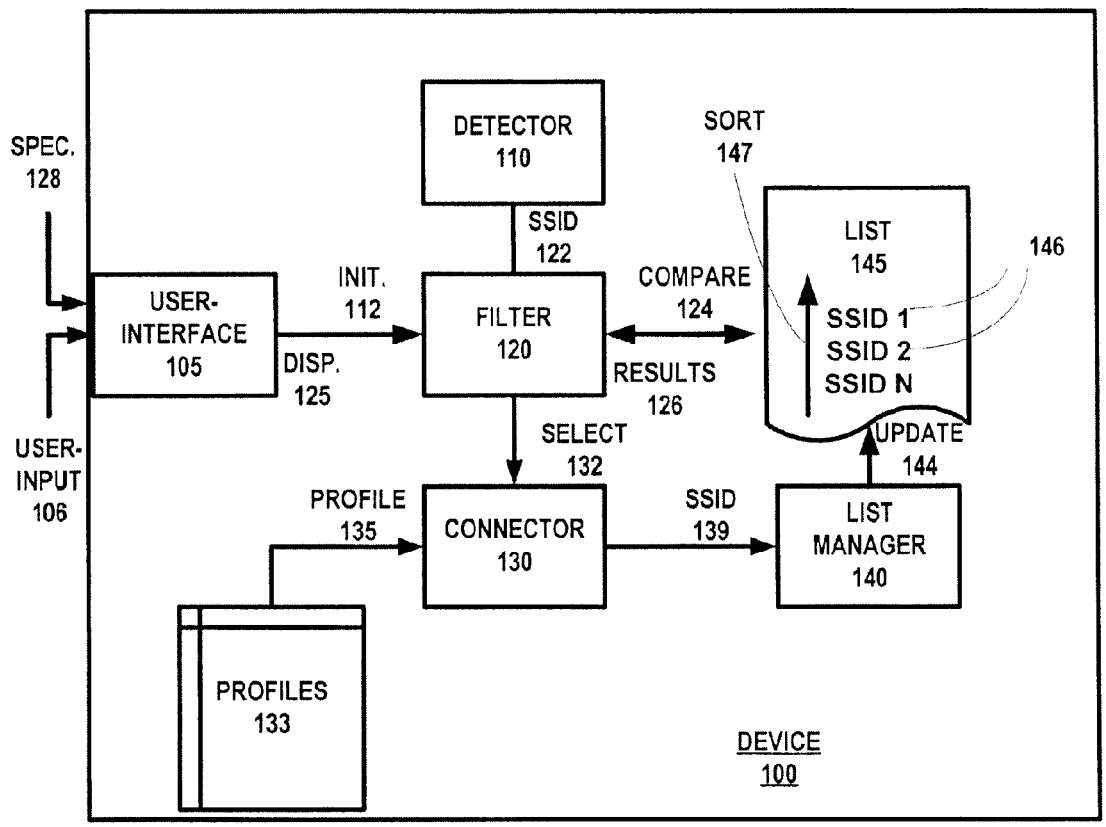
FIG. 1 illustrates a system for managing wireless local area networks, according to an embodiment of the invention.

Embodiments described herein provide for a device that is configured to maintain a list (or similar data) of wireless access points and networks that are known to the device. The list may be maintained to automate some or all of the steps needed to make a wireless access point or network connection. In addition, the list may be maintained to enable the device (or user) to select which network or access point to connect to before attempting to make any connection at all. This makes the process of the device connecting to a wireless access point more efficient, as the device does not attempt to serially attempt connection with individual access points and networks identified on a list before either failing or finding an available network or access point.

Embodiments described herein manage network connectivity on a device. In particular, one or more embodiments manage wireless network connectivity, such as provided through wireless fidelity and similar network connections. In one embodiment, an identifier of each wireless access point or network that is available at a given location is determined. The identifier determined without the device attempting to connect to any available wireless access point or network at the given location. Each determined identifier is compared to one or more network identifiers that are known to the device. The device connects to an available wireless access point having the identifier that is known and detected.

As an alternative, the device displays or enables the user to select to connect to the network or wireless access point that is known and detected. Thus, an embodiment provides that the user is shown a list of available and known networks for selection. The device may make a pre-selection or other designation to simplify the user's input for making the subsequent selection.

Still further, one or more embodiments provide that the device can, automatically, perform the following: detect available wireless access points, identify which of the available wireless access points are known, and connect to a selected one of the wireless access points. Thus, the user may only need to initiate or indicate a desire to have a wireless connection.

Numerous types of computing devices may be used with embodiments described herein. One type of computing device for use with an embodiment is a wireless, mobile computing device, sometimes called the "smart phone" for use in cellular telephony and data transmissions. Another type of computing device for use with an embodiment is a personal digital assistant ("PDA"). Both of these devices are generally small enough to fit in one hand, and often operate applications that include contact applications for managing contact records, calendar applications for managing and scheduling events, task applications for keeping lists, and camera applications for capturing images.

As used herein, the term "Wi-Fi" is representative of a particular kind of wireless local area network ("WLAN"). Unless stated otherwise, wireless local area networks (wireless access points) include one or more devices that provide a gateway for enabling one or more connecting computing devices to wirelessly connect to the Internet or to shared network resources. In a state of non-use, it is possible for a wireless access point to include only a gateway and/or router with a wireless transmitter.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Overview

FIG. 1 illustrates a system for managing connectivity to wireless access points and WLANs, according to an embodiment of the invention. A system such as illustrated with FIG. 1 may be implemented on a portable computing device 100 with ability to connect to wireless access points and networks, such as those that operate under Wi-Fi or similar standards. The portable computing device 100 may correspond to, for example, a laptop computer, a personal digital assistant (PDA), or a mobile computing device such as a smart phone. A device such as described may include integrated capabilities for connecting to a wireless access point, or may be provided such capabilities through accessory functionality (e.g. wireless card).

In FIG. 1, device 100 includes a network detector 110, a filter 120, a connector 130, and a list manager 140. The list manager 140 maintains and updates a list 145, containing entries 146 representing identifiers of individual Wireless LANs (called WLANs typically found in home and office network environment), hot spots, or wireless access points (collectively referred to as "wireless access points"). In one embodiment, the entries 146 of the list 145 correspond to identifiers of wireless access points that the device has connected to on one or more previous connections. Such wireless access points may be considered as being known to the device 100. In one implementation, a profile exists in a profile store 133 for connecting the device 100 to each of the wireless access points identified by the list 145. Individual profiles of the profile store 133 may specify, for example, the encryption method and password used at a particular point, or with a network having a particular SSID. While one profile may apply to more than one wireless access point, one implementation provides that the device 100 has sufficient data and information to programmatically connect to each wireless access point on the list 145. As will be described, the list 145 is used to establish wireless access point connectivity at a given instance. A user-interface 105 may provide functionality to enable a user to enter input and view status and other information regarding available networks, connected networks and other options. In an embodiment, the list 145 defines or identifies wireless access points and networks that are known to the device. While examples and embodiments described herein assume that the term wireless access point and network are both interchangeable, it should be noted that many times, a wireless network may be distributed across numerous locations, and may use various wireless access points. For example, a wireless service may provide nationwide service for wireless network connectivity through use of hotspots. Even though the locations and the access points differ within the service, such services typically employ the same SSID or identifier. Furthermore, such services also employ the same network configurations. Thus, an entry on list 145 that identifies a particular network or access point may in fact identify numerous access points, and even more than one network, particularly when one provider offers the different access points and networks.

While the list 145 may include, as entries, the identifiers of networks that the device 100 has previously connected to, one or more embodiments also contemplate the list 145 include entries that correspond to network or access point identifiers from other sources. For example, the user may manually specify one of the entries 146, or some or all of the entries may be provided to the device as part of a configuration file. For example, an enterprise may supply the user with a configuration file that identifies one or more SSIDs of an enterprise network, and the SSIDs specified from the configuration file may be added to the list 145.

Furthermore, the list 145 may be contained in alternative forms. For example, list 145 may be in the form of an index or file folder, or maintained as multiple lists.

In one embodiment, the user-interface 105 receives input 106 that initiates the device 100 to make a connection with a wireless access point. Alternatively, the request may be generated from an application that requests (manually or programmatically) a network connection. The network detector 110 may respond to an initiation 112 by scanning for wireless access points in a vicinity of the location of the device 100. From its scan, the detector 110 may determine identifiers of any wireless access point that is available, or at least making its presence known to the device at that location. In one embodiment, the identifiers that are detected are Service Set Identifiers (SSID), which correspond to alphanumeric names or identifiers of wireless access points.

The detector 110 communicates the SSIDs 122 of any detected network to the filter 120. The filter 120 performs a comparison 124 of the SSID 122 with entries 146 of the list 145 that represent SSIDs of wireless access points from past connections. From the comparison 124, the filter 120 identifies results 126, which may include (i) nothing or null result, or (ii) a set of one or more SSIDs that represent wireless access points that are both detected (available) and known to the device 100. In one implementation or mode of operation, the filter 120 provides a display 125 of the SSID of only those detected networks that are known to the device 100. The display of the detected and known SSIDs may be made through the user-interface 105. In one implementation or mode of operation, the user can then select from the SSIDs presented, and a selection 132 is communicated to the connector 130.

In another implementation or mode of operation, the device 100 is more fully automated. If any of the detected SSIDs 122 are identified by the filter 120 as being on the list 145, the filter 120 automatically makes the selection 132 that is communicated to the connector 130. In either case, the selection 132 identifies the SSID of a wireless access point from the list 145. As described with an embodiment of FIG. 2, in some cases more than one detected SSID 122 may be found on the list 145, in which case a prioritization scheme 147 is used by the filter in making the selection 132. As described elsewhere, the prioritization scheme 147 may correspond to a priority based on most-recently used and/or most commonly used wireless access points. Another priority scheme may be based on signal strength or signal characteristics generated from different known networks. Such a priority scheme may be independent of the sort used on the list 145, but rather a programmatic on-the-fly implementation.

In the implementation or mode where the user makes the selection 132 from choices presented by the filter 120, the prioritization scheme 147 may configure the order of the SSIDs presented to the user. In one embodiment, a "preselection" may also be made for the user, based on the prioritization scheme provided. For example, the SSID dictated by the prioritization scheme 147 as being most likely preferred may be highlighted, so that the user simply enters input through, for example, a mechanical selection feature (such as a selection button or 5-way navigation button).

In response to receiving the selection 132, the connector 130 makes an attempt to connect with the wireless access point identified by the SSID of the selection. Thus, under an embodiment, the connector 130 attempts to make a connection only after identifying which wireless access point the device 100 should connect to. This eliminates considerable inefficiency associated with many conventional approaches that attempt to connect a device to all detected wireless access points in a given range, without first making any attempt to first select the wireless access point that the device will connect to. Such conventional approaches do not make an attempt to triage the detected access points and networks against a list of known networks, or a list of networks the user is interested in using. Furthermore, in an embodiment or mode of operation where connectivity is automated, the device 100 is able to establish connectivity quickly after a simple input or trigger from the user to make a wireless connection.

In making the connection, connector 130 may identify a profile 135 from the profile store 133. The identified profile 135 may be associated with the SSID and/or wireless access point of the selection 132. For example, a profile may store settings and a security password to enable the connector 130 to perform necessary operations to make a connection with the selected wireless access point, or alternatively to prompt the user to enter data (e.g. a password) for making that connection. Profiles in the profile store 135 may be created from user-input, programmatic determinations and input as determined from a wireless access point or network, or profiles may be downloaded or pre-loaded onto the device 100 from another source.

If the filter 120 does not identify any available wireless access points that correspond to entries 146 on list 145, one embodiment provides that the filter 120 provides a null output to the user-interface 105 as part of the display communication 125. In turn, the user-interface 105 provides functionality to enable the user to select an unknown WLAN or wireless access point, scan for a new wireless access point, and/or to manually specify a wireless access point that is not identified by the list 145. The user may make a specification 128 of a wireless access point, by for example, specifying the SSID through manual character entry, performing a new scan, and/or being presented a list of available networks (from detector 110) and enabling manual selection. The connector 130 may then use the SSID or wireless access point identified by the specification 128 to make a new connection. In making the new connection, the user-interface 105 may provide a series of prompts or wizard to cause the user to input selections and/or configuration data. As described with an embodiment of FIG. 4, the user-interface 105 for enabling the user to create a new connection may be provided on a single panel. This facilitates operation of the user-interface when a small display or form factor is in use.

Under an embodiment, each time the connector 130 makes a connection to a wireless access point, the connector communicates the SSID 139 of the wireless access point to the list manager 140. The list manager 140 implements the prioritization scheme 147. In one embodiment, the list manager 140 provides an update 144 to the list 145, based on the SSID 139 of the recently connected wireless access point. The update 144 may add the SSID of a new wireless access point to the list 145. As an addition or alternative, the update 144 may update the priority scheme 147. In one implementation, the priority scheme 147 prioritizes or sorts entries 146 based on a most recently used criteria. Thus, the update 144 may include an SSID that is added to the top of the list 145. In an alternative case where the priority scheme 147 is based on a most commonly used criteria, the update 144 may identify the SSID of the wireless access point the device connected to, and a counter (not shown) may iterate to reflect a value of how often the identified wireless access point was used.

Under an embodiment, the list manager 140 may also interface or provide a component of the user-interface 105, in order to perform one or more of the following: (i) render the list 145 (in the form of SSIDs) to the user, (ii) enable the user to add an entry, (iii) enable the user to edit entries existing on the list, (iv) enable the user to sort the list 145 in a manner that differs from the prioritization scheme 147, and/or (v) enable the user to remove an entry from the list 145. In this way, the list manager 140 provides an efficient mechanism by which the user can manually add a network, change the SSID of a network, or delete an entry entirely.

Figure 2:
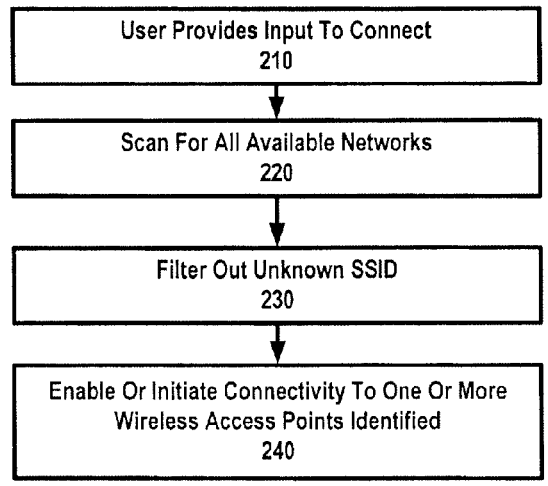
FIG. 2 illustrates a method for managing wireless network connectivity, under an embodiment of the invention.

FIG. 2 illustrates a method for managing wireless network connectivity, under an embodiment of the invention. A method such as described with FIG. 2 may be implemented using, for example, elements shown and described with FIG. 2. As such, reference to elements of FIG. 2 is intended to illustrate only suitable elements for performing a step or sub-step being described.

In a step 210, a user indicates a desire to connect the device 100 to a wireless network. For example, the user-may select an icon or other feature on an application or on the user-interface 105 to initiate a Wi-Fi connection.

In step 220, a scan is performed to identify all available networks. In an implementation such as shown by FIG. 1, the detector 110 may perform the scan to identify any WLAN or other wireless access point through its SSID. In one implementation, the scan is performed automatically, in response to the indication or input from the user. Other implementations provide for the scan to be performed manually, or to be the same as the user's indication for connectivity from step 210.

According to one embodiment, under a step 230, the device automatically filters out the SSID (or other identifiers) of any WLAN/wireless access points that is not known to the device. The wireless access point may be known to the device if the device previously connected to it. As an alternative or addition, the wireless access point may be known to the device if the wireless access point has a profile or other information associated with the wireless access point. For example, a profile or information about a wireless access point may be preloaded on a device, or loaded onto it independent of the device ever having connected to the associated network or wireless access point.

Step 240 provides that connectivity to one of the wireless access points identified by the filtered results is enabled or initiated. For example, the device may operate under one mode where the user has to select from the filtered results and/or initiate the connection. Alternatively, the device may make the selection and initiate the connection automatically.

Figure 3A:
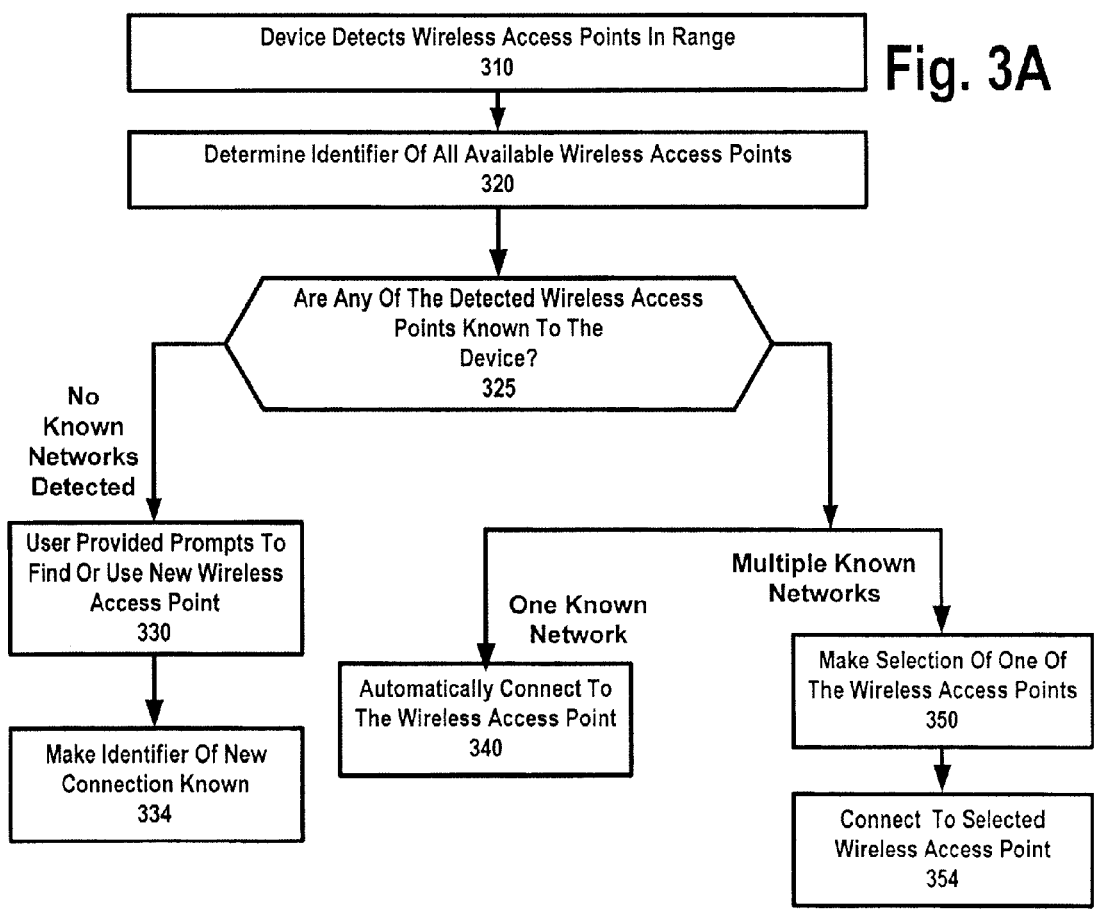
FIG. 3A illustrates a method for enabling wireless network connectivity, under an embodiment of the invention.

FIG. 3A illustrates a method for enabling wireless network connectivity, under an embodiment of the invention. Under one embodiment, a method such as described by FIG. 3A may be performed automatically, using, for example, a device such as described with an embodiment of FIG. 1. Accordingly, reference to elements of FIG. 1 is intended to illustrate only suitable elements for performing a step or sub-step being described.

In a step 310, device 100 detects available wireless networks or access points in its vicinity. The available networks in a vicinity may broadcast their respective SSIDs, which in turn can be detected by configured ports on the computing devices. In this way, the detector 110 may scan and identify the SSID of each network.

In step 320, the device determines the identifiers of all available wireless networks at the location of the device. In one implementation, the identifiers are broadcast by the wireless network and detected by hardware and logic on the computing device. In the case of Wi-Fi networks, an identifier may correspond to the SSID of a nearby Wi-Fi network. In other implementations, however, other forms of network and network identification may be used, such as unique or identifying characteristics or attributes of the wireless network or its broadcasts. Other information may also be used to identify the wireless network. For example, the identifier of the available networks may be based at least in part on the geographic location (such as provided by a Global Positioning System device) of the device when network access is sought.

In step 325, a determination is made as to whether any detected wireless network from step 320 is known to the device. In one embodiment, the detected wireless network is known because the device previously connected to the wireless network. Alternatively, the wireless network may be known to the device if the device has, associated with the detected wireless network, a profile for connecting to that wireless network. Thus, for example, one or more implementations contemplate that wireless network profiles (including SSID) may be stored on the device before the device is ever used to connect to those networks. In an embodiment such as described with FIG. 1, a wireless network is known to the device when the identifier of the wireless network is on the list 145.

Assuming step 320 detects wireless networks, three outcomes may result from step 325. In one case, the determination of step 325 is that none of the detected wireless networks are known to the device. For example, the user may initiate an attempt to connect to a wireless network at a new location (e.g. when the user travels). In this case, step 330 provides that the user is prompted to connect to an unknown wireless network. In one embodiment, a wizard or other program may display a user-interface to guide the user in selecting a new wireless network for connectivity. The wizard may guide the user in providing necessary input to make the connection. Once the connection is made, under one embodiment, step 334 provides that an identifier of the new wireless network is made known to the device. For example, the SSID of the new wireless network may be added to the list 145 (FIG. 1).

If the determination in step 325 is that one of the detected wireless networks from step 320 is known to the device, then step 340 provides that the device automatically connects to that wireless network. In one implementation, the device may retrieve a profile associated with the wireless network, and use the profile to make the connection. But the device first attempts to make a connection after detecting the available wireless networks and making the determination as to whether any of the wireless networks are known. Thus, for example, the device does not stall or waste time attempting to connect to a wireless network that is not available or present at the location.

If the determination in step 325 is that more than one wireless network from step 320 is known to the device, then step 350 provides that the device selects one of the wireless networks for the connection. According to an embodiment, the selection is made through use of a prioritization scheme. In one implementation, the prioritization scheme is a most-recently used scheme, where the selected wireless network is the network that was most recently used in the past. In another implementation, the prioritization scheme is a most commonly used scheme, where the selected wireless network is the network that was most commonly used in the past. In such an embodiment, the device may be configured to count each instance of connecting to a particular wireless network. Still, other implementations may use other forms of prioritization, including a hybrid of most recently and commonly used. Also, the device may designate (e.g. through user-input) some or all of the priories. For example, the user may specify that a Home network is always prioritized, or that secure networks are always prioritized over non-secure networks. Once the selection is made, step 354 provides that the device makes the connection. As in the previous case, the device first makes the connection after identifying the available networks and making a selection as to which network to connect to. Thus, the amount of time the user waits before the connection is made is minimal, as compared to more conventional approaches where minutes may pass while the device attempts to make connections with wireless networks that are not available.

When an automated implementation or mode is used, step 350 and 354 may be performed at one time by the device 100. However, when an implement or mode requests input form the user, step 354 may be performed after the user is prompted and enters an input. For example, with reference to FIG. 4, the selection may sort the entries provided to the user, and enable the user to enter a selection input to confirm the particular network selected by the device 100. As another example, the network selected by the device 100 may be displayed as an in-focus or other pre-selection, which the user can then confirm.

Figure 3B:
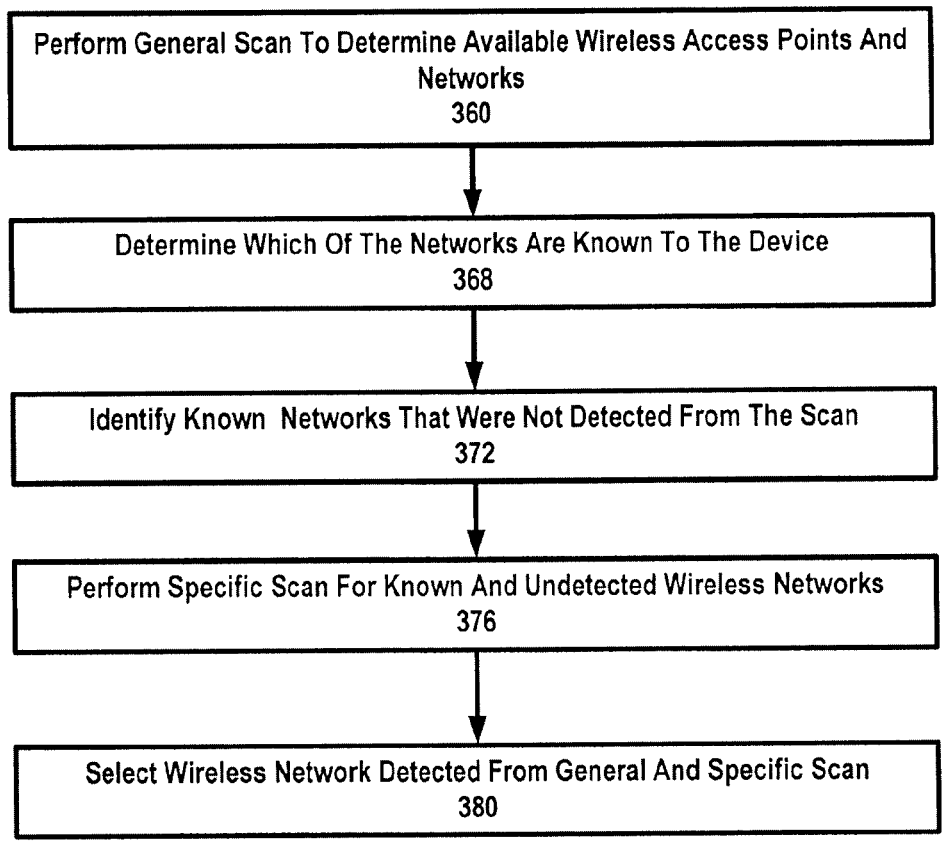
FIG. 3B illustrates another method for enabling a device to detect and connect with a hidden wireless access point, under an embodiment of the invention.

FIG. 3B illustrates another method for enabling detection and connection with hidden networks, under an embodiment of the invention. A method such as described with FIG. 3B may be performed in connection with or as part of a method of an embodiment of FIG. 3A. However, in one or more other embodiments, a method such as described with FIG. 3B may be performed on a device independently of, or without use of an embodiment of FIG. 3A. As with other embodiments, reference may be made to elements and components of FIG. 1, for illustrating suitable elements and components for performing a step or sub-step.

In a step 360, the device 100 performs a general scan for available wireless networks and access points. The result of the scan is that available networks are identified. An embodiment recognizes that not all available networks in a given area may be detectable. For example, an available network may be hidden, as part of the security feature employed with that network. As such, networks detected as a result of performing step 360 may exclude hidden networks.

As an optional step, step 368 provides that the device identifies which of the detected networks (or wireless access points) that are known to the device. For example, as described with an embodiment of FIG. 3A, the device 100 may perform a comparison of SSIDs of detected network against entries 146 of the list 145. The result of the comparison may yield the SSID of available networks that are identified from the general scan, and which are known to the device.

In a step 372, the device 100 identifies which wireless networks that are otherwise known to the device (e.g. SSIDs on list 145) were not identified from the scan. For example, if the device 100 performs a general scan and identifies 10 networks, 2 of which are known to the device, and the user's list 145 had 4 networks, the device may identify the 2 known but not detected networks (or their respective SSIDs) as a result of this step.

In a step 376, the device makes a specific scan for each, or at least some, of the known networks that were not detected from the scan. The specific scan may involve the device performing a scan for a wireless network using the SSID of the known but undetected network.

Step 380 provides that one of the wireless networks that are known and identified following steps 368 and step 380 is selected for connection. As described elsewhere, the selection may be made using a priority scheme. The selection may result in the device 100 performing an automatic connection operation to the network identified by the SSID. Alternatively, the selection may result in presenting the selected network to the user for a manual selection. As still another alternative, the selection may result in presenting a list to the user with the selected network being in a pre-selected state. Similarly, all or some steps of a method such as described with FIG. 3B that are programmatically performed may also be automated, without user-intervention, or alternatively, manually triggered or have some user-intervention.

Small Form-Factor User-Interface

One or more embodiments described herein may be implemented on a small form-factor device, such as a mobile computing device (e.g. smart or cellular phone) or personal digital assistant or other handheld device. Such devices are usually characterized by small screen sizes, as compared to, for example, laptop computers or desktops. For example, many PDA devices currently in use of screen resolution of the order of 240×240 or 320×320 pixels. Furthermore, such devices often have limited ability to accept alphanumeric inputs, as they often employ handwriting recognition or small or virtual keyboards.

In order to facilitate user's in managing Wi-Fi (and other wireless access point connectivity), one or more embodiments include a user-interface that provides the user with necessary functionality and information for enabling Wi-Fi connectivity and management on a single panel. The term panel refers to a presentation of all information that is presented to the user at once on a designated region of the display.

Figure 4:
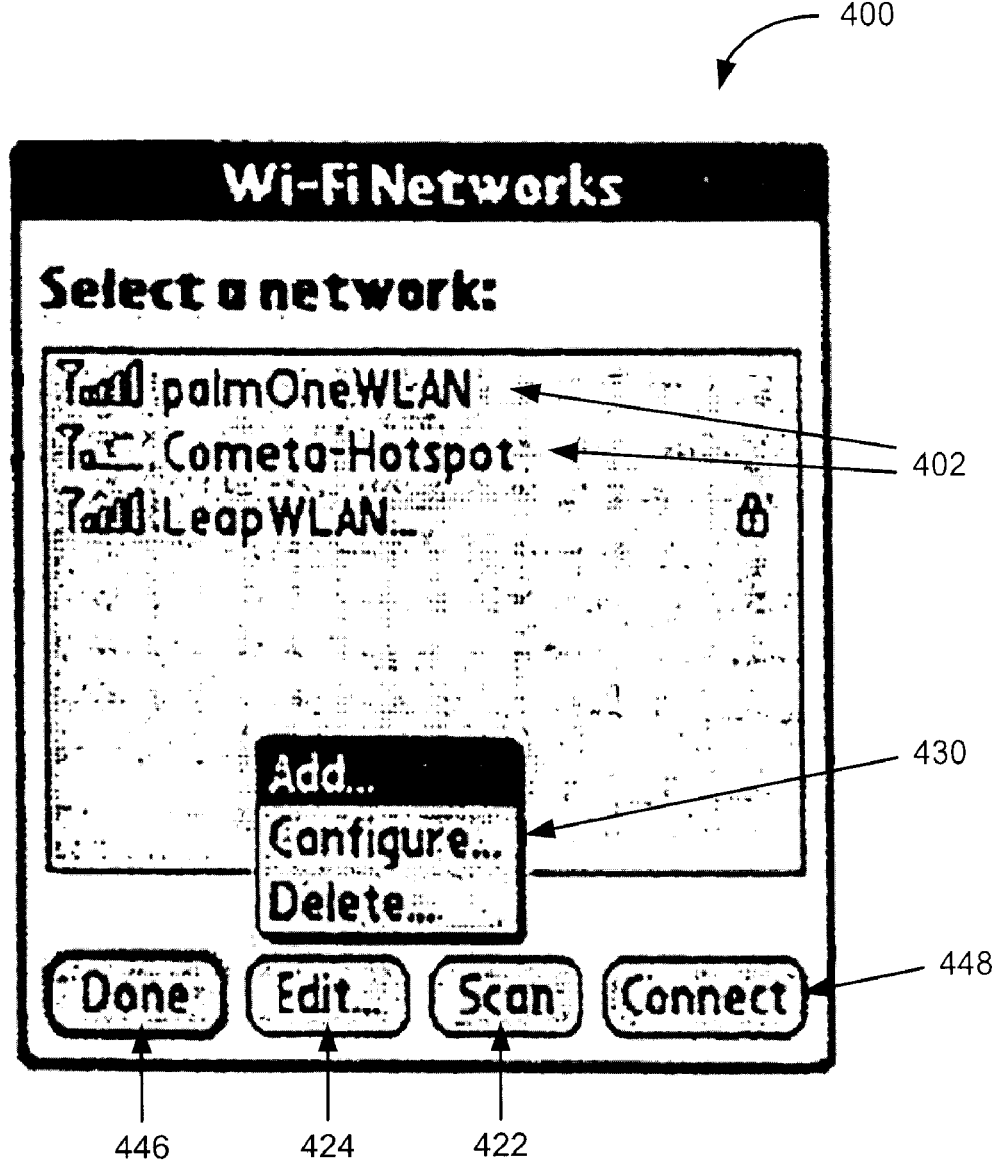
FIG. 4 illustrates a panel of a user-interface feature for an application that manages wireless fidelity connectivity on a device, under an embodiment of the invention.

FIG. 4 illustrates a panel 400 for an application that manages Wi-Fi connectivity on a device. A panel 400 such as shown may correspond to, for example, the rendering of the user-interface 105 in an embodiment of FIG. 1. A single panel 400 may enable the user to perform, at least in some cases, all operations necessary to enable the user to connect with a wireless access point.

The panel 400 may include entries 402 corresponding to SSID identifiers of one or more wireless access points or networks. The entries 402 may be presented to the user after a scan operation is performed to detect available networks. A scan icon 422 may be presented to the user to enable the user to select a scan operation to refresh the list without launching another panel. As shown by an embodiment of FIG. 4, the panel 400 may display and provide interface features related to establishing connectivity with surrounding wireless access points and networks. One or more embodiments contemplate managing much, if not all, of the functionality for establishing wireless connectivity on the single panel 400. If the user selects one of the icons that provide functionality for enabling connectivity, one or more embodiments provide that, at least some of the icons, when selected, cause additional functionality to appear in an overlaying window. As the overlaying window occupies no additional real-estate on the display, the overlaying window becomes part of the panel 400.

The panel 400 also presents an edit icon 424 that opens a pop-up window 430, without switching away from the panel 400. As such, the window 430 forms part of the panel when it is present. The window 424 enables the user to select operations for adding or editing a wireless access point, as selected from panel 400. For example, with reference to an embodiment of FIGS. 1 and 3, the user may add a wireless network when the detector 110 identifies networks that are not on the list 145. The user may also edit a wireless network, including new networks, to change, for example, security settings, passwords or the network name. Selection of either an add icon 426 or an edit selection 428 may open another window (not shown) to form a portion of panel 400, or it may open another panel altogether.

According to an embodiment, the panel 400 may provide numerous other types of information. One of the entries 402 on panel 400 may be selected by the user through input to correspond to the selection 132 (FIG. 1). Thus, the entries 402 may correspond to a list of wireless access points that were detected and filtered as being known (e.g. by filter 120). If no known devices are identified, the panel 400 may display to the user a need to setup a new network for the device.

Similar to an embodiment shown by FIG. 4, a panel may be used with functional icons and other features to enable the user to manage the list 145 (FIG. 1). For example, the user can use a panel to view the list 145 (FIG. 1), to edit entries 146 (FIG. 1) on the list, to re-prioritize or set priorities amongst individual entries, to add SSIDs or networks to the list, and to delete entries from the list.

In addition, an embodiment contemplates use of a navigation scheme for facilitating use of a user-interface, such as provided with panel 400. In one embodiment, the navigation scheme is implemented with a 5-way navigation button, having ability to receive both directional and selection input. Other multi-dimensional navigational mechanical interfaces may also be used.

In one embodiment, an intuitive navigation scheme is used to enable the user in selecting from a list of wireless access points. The input needed from the user in making the selection may requires minimal use of one mechanical interface, while eliminating the need to make "screen taps" (when contact sensitive displays are used) or alphanumeric entries. In one implementation, all input needed to for the user to make a connection to a wireless access point may be provided with a combination of (i) default input settings and (ii) input from the user.

For example, under one implementation shown by an embodiment of FIG. 4, when the panel 400 is first shown, none of the networks are pre-selected. A default focus is on the icon "Done" 446, so that a selection input implements the operation associated with done (close out of the panel 400). This allows a user who just wants to see the status of available networks to quickly exit the panel 400. Once the panel 400 is displayed, if the user selects navigation input (i.e. up or down), the focus or pre-selection state moves from the Done 446 to the Connect icon 448. If the user selects the Connect icon 448, the device attempts to connect to the first network on the list of the panel. In one embodiment, this entries on the panel 400 are sorted. For example, the top entry is the most commonly or recently used, or is only known network resulting from the scan.

In one embodiment, the user can enter vertical, up-down navigation input to select a network from panel 400. The user can enter horizontal left-right navigation input to cause preselection or focus to move from one button or icon to the next.

While embodiments described with FIG. 4 contemplate user-input and some manual intervention in facilitating the user to have wireless connectivity, embodiments such as described with FIG. 1 and FIG. 3A further contemplate a completely automated feature for enabling wireless connectivity. Thus, according to one or more embodiments, panel 400 may never be displayed when the user selects to have wireless connectivity, and the detected networks are known to the device.

Out-of-the-Box Configuration

For a user that has not configured any networks and tries to use Wi-Fi on the device (e.g. click a link on the web browser), embodiments described herein provide a wizard that allows the user to jump directly to the network configuration flow for establishing first-time connectivity with a particular Wi-Fi Network or other wireless access point. At the end of the network configuration, the device connects to the wireless access point and returns to the data application that requested the network connection (e.g. the browser in our example). This eases the users' transition from the application that requested the network connection (e.g. the browser in our example) to the complexity of configuring networks and back.

Hardware Diagram

Figure 5:
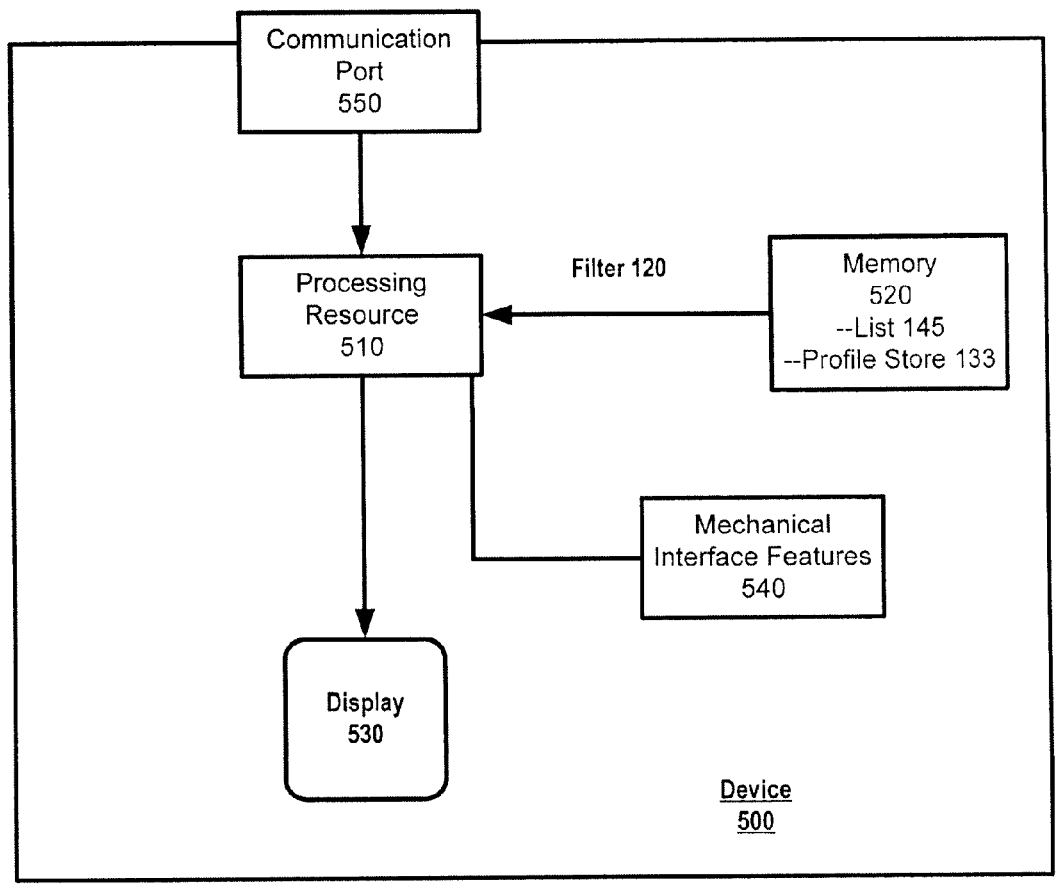
FIG. 5 is a simplified hardware illustration of a device for implementing an architecture such as described with FIG. 1, under an embodiment of the invention.

FIG. 5 is a simplified hardware illustration of a device for implementing an architecture such as described with FIG. 1, under an embodiment of the invention. In FIG. 5, a device 500 includes a processing resource 510 (e.g. one or more processors), one or more memory 520 for storing applications and data used by the applications (e.g. Flash memory or RAM), a display 530, a set of mechanical interface features 540 (e.g. keyboard, 5-way navigation component), and a wireless communication port 550. In one embodiment, the wireless communication port 550 is configured as a Wi-Fi port, such as for use in communicating on the IEEE 802.11(b) or (g) standards. As shown by FIG. 5, the processing resource 510 may execute to retrieve instructions for implementing the filter 120 (FIG. 1) and list manager 140, and for use with operations performed by detector 110, connector 130. The memory resources 520 may store profile store 133 (FIG. 1) and the list 145 (FIG. 1).

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for managing network connectivity on a device, the method being performed by a processor of the device and comprising:
    performing a general scan to determine an identifier of each network that is available at a given location, wherein determining the identifier is performed without attempting to connect to any available network at the given location;
    determining which of the networks that are available at the given location are known to the device by comparing each determined identifier to a list of known identifiers of networks that the device has previously connected to; and
    determining one or more hidden networks protected by security features that are known to the device by (i) identifying one or more known identifiers from the list that did not match the determined identifiers from the general scan, and (ii) performing an additional operation using the one or more known identifiers that were not determined from the general scan to detect the one or more hidden networks.

2. The method of claim 1, further comprising programmatically selecting one of the available networks or the one or more hidden networks protected by security features, and automatically connecting to that network.

3. The method of claim 1, further comprising maintaining the list of known identifiers of networks that the device has previously connected to.

4. The method of claim 3, wherein maintaining the list of one or more network identifiers includes sorting the list of one or more network identifiers based, at least in part, on either a most recently used prioritization scheme or a most commonly used prioritization scheme.

5. The method of claim 4, wherein programmatically selecting one of the available networks or the one or more hidden networks protected by security features is performed by using either the most recently used prioritization scheme or the most commonly used prioritization scheme.

6. The method of claim 1, wherein performing a general scan includes detecting the identifier of each network that is broadcast by individual wireless local area networks.

7. A method for managing network connectivity on a device, the method being performed by a processor of the device and comprising:
- performing a general scan to determine an identifier of each network that is available at a given location, wherein determining the identifier is performed without attempting to connect to any available network at the given location;
- determining which of the networks that are available at the given location are known to the device by comparing each determined identifier to a list of known identifiers of networks that the device has previously connected to;
- determining one or more hidden networks protected by security features that are known to the device by (i) identifying one or more known identifiers from the list that did not match the determined identifiers from the general scan, and (ii) performing an additional operation using the one or more known identifiers that were not determined from the general scan to detect the one or more hidden networks; and
- enabling a user to select a network from one of the available networks or the one or more hidden networks protected by security features.

8. The method of claim 7, further comprising maintaining the list of known identifiers of networks that the device has previously connected to.

9. The method of claim 8, wherein maintaining the list of one or more network identifiers includes sorting the list of one or more network identifiers based, at least in part, on either a most recently used prioritization scheme or a most commonly used prioritization scheme.

10. The method of claim 9, wherein enabling the user to select a network from one of the available networks or the one or more hidden networks protected by security features includes presenting the list of one or more network identifiers to the user with the selected network in a pre-selected state.

11. The method of claim 10, wherein presenting the list of one or more network identifiers to the user with the selected network in a pre-selected state is performed by using either the most recently used prioritization scheme or the most commonly used prioritization scheme.

12. The method of claim 7, wherein performing a general scan includes detecting the identifier of each network that is broadcast by individual wireless local area networks.

13. A computing device comprising:
- a display;
- a wireless communication port; and
- a processor configured to:
    - perform a general scan to determine an identifier of each network that is available at a given location, wherein determining the identifier is performed without attempting to connect to any available network at the given location; and
    - determine which of the networks that are available at the given location are known to the device by comparing each determined identifier to a list of known identifiers of networks that the device has previously connected to; and
    - determine one or more hidden networks protected by security features that are known to the device by (i) identifying one or more known identifiers from the list that did not match the determined identifiers from the general scan, and (ii) performing an additional operation using the one or more known identifiers that were not determined from the general scan to detect the one or more hidden networks.

14. The computing device of claim 13, wherein the processor is further configured to programmatically select one of the available networks or the one or more hidden networks protected by security features, and automatically connect to that network.

15. The computing device of claim 13, wherein the processor is further configured to enable a user to select a network from one of the available networks or the one or more hidden networks protected by security features.

16. The computing device of claim 15, wherein a user interface panel is presented on the display to enable the user to select a network from one of the available networks or the one or more hidden networks protected by security features.

17. The computing device of claim 13, wherein performing a general scan includes detecting the identifier of each network that is broadcast by individual wireless local area networks.

* * * * *